US012652684B2

(12) United States Patent
Panteleev et al.

(10) Patent No.: US 12,652,684 B2
(45) Date of Patent: Jun. 9, 2026

(54) INTER-UE COORDINATION SIGNALING FOR SIDELINK COMMUNICATION

(71) Applicant: Intel Corporation, Santa Clara, CA (US)

(72) Inventors: Sergey Panteleev, Maynooth (IE); Alexey Khoryaev, Nizhny Novgorod (RU); Mikhail Shilov, Nizhny Novgorod (RU); Dmitry Belov, Nizhny Novgorod (RU); Kilian Peter Anton Roth, Munich (DE); Artyom Lomayev, Nizhny Novgorod (RU); Andrey Chervyakov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 303 days.

(21) Appl. No.: 18/280,499

(22) PCT Filed: Mar. 30, 2022

(86) PCT No.: PCT/US2022/022495
§ 371 (c)(1),
(2) Date: Sep. 6, 2023

(87) PCT Pub. No.: WO2022/212465
PCT Pub. Date: Oct. 6, 2022

(65) Prior Publication Data
US 2024/0155654 A1 May 9, 2024

Related U.S. Application Data

(60) Provisional application No. 63/169,707, filed on Apr. 1, 2021, provisional application No. 63/169,710, filed
(Continued)

(51) Int. Cl.
*H04W 72/04* (2023.01)
*H04L 1/1829* (2023.01)
(Continued)

(52) U.S. Cl.
CPC ........... *H04W 72/40* (2023.01); *H04L 1/1854* (2013.01); *H04W 72/0446* (2013.01)

(58) Field of Classification Search
CPC . H04W 72/40; H04W 72/0446; H04W 72/20; H04W 4/40; H04W 72/02;
(Continued)

(56) References Cited

U.S. PATENT DOCUMENTS 11,323,228 B2 * 5/2022 Baghel ...................... H04L 5/14
11,356,979 B2 * 6/2022 He ........................ H04L 1/1861
(Continued)

FOREIGN PATENT DOCUMENTS

CN       116941294 A       10/2023
WO       2021028565        2/2021
(Continued)

OTHER PUBLICATIONS

"International Application Serial No. PCT/US2022/022495, International Preliminary Report on Patentability mailed Oct. 12, 2023", 7 pgs.
(Continued)

*Primary Examiner* — Lan-Huong Truong
(74) *Attorney, Agent, or Firm* — Schwegman Lundberg & Woessner, P.A.

(57) ABSTRACT

An apparatus and system for inter-UE coordination feedback for sidelink communications are described. In particular, inter-UE coordination feedback signaling for reliable sidelink communication including transmitter-based resource allocation and signaling of conflicts, prioritization of the inter-UE coordination feedback, and timing of the inter-UE coordination feedback are described. Sidelink hybrid acknowledgment request (HARQ) acknowledgment/negative acknowledgment (ACK/NACK) or NACK only signaling is prioritized over a half-duplex (HD) or co-channel
(Continued)

collision (CC) feedback indication, and uplink transmissions are prioritized over sidelink transmissions. In response to detection of a conflict, the inter-UE coordination feedback is transmitted relative to the slot where the HD or CC event occurs or relative to the slot where reservation of the resources for the sidelink transmissions.

17 Claims, 13 Drawing Sheets

Related U.S. Application Data on Apr. 1, 2021, provisional application No. 63/169,781, filed on Apr. 1, 2021.

(51) Int. Cl.
  *H04W 72/0446* (2023.01)
  *H04W 72/40* (2023.01)

(58) Field of Classification Search
  CPC .... H04W 92/18; H04L 1/1854; H04L 1/1887; H04L 2001/0093; H04L 1/1825; H04L 1/1864; H04L 1/1896; H04L 5/0037; H04L 5/0055; H04L 1/1861
  See application file for complete search history.

(56)       References Cited

U.S. PATENT DOCUMENTS

| | | | | |
|---|---|---|---|---|
| 11,510,233 | B2 * | 11/2022 | Wang | H04W 72/1263 |
| 2022/0046603 | A1 * | 2/2022 | Hosseini | H04W 4/40 |

FOREIGN PATENT DOCUMENTS

| | | | | |
|---|---|---|---|---|
| WO | WO-2022032294 | A1 * | 2/2022 | H04W 92/18 |
| WO | WO-2022212465 | A1 | 10/2022 | |

OTHER PUBLICATIONS

"Considerations on Inter-UE Coordination for Mode 2 Enhancements", Fujitsu, R1-2100746, 3GPP TSG RAN WG1 #104-e, (Jan. 18, 2021), 1-21.

"Discussion on feasibility and benefits for mode 2 enhancements", LG Electronics, R1- 2100518, 3GPP TSG RAN WG1 #104-e, (Jan. 19, 2021), 1-26.

"Discussion on Mode 2 enhancements", Mediatek Inc., R1-2101926, 3GPP TSG RAN WG1 #104-e, (Jan. 29, 2021), 1-9.

"Discussion on sidelink resource allocation for reliability and latency enhancements", NTT Docomo, Inc., R1-2006748, 3GPP TSG RAN WG1 #102-e, (Aug. 8, 2020), 1-5.

"Inter-UE Coordination for Mode 2 Resource Allocation", Apple, R1-2101358, 3GPP TSG RAN WG1 #104-e, e-Meeting, (Jan. 18, 2021).

"International Application Serial No. PCT/US2022/022495, International Search Report mailed Jul. 7, 2022", 2 pgs.

"International Application Serial No. PCT/US2022/022495, Written Opinion mailed Jul. 7, 2022", 5 pgs.

"Japanese Application Serial No. 2023-560776, Notification of Reasons for Refusal mailed Dec. 9, 2025", W English Translation, 11 pgs.

"Inter-UE coordination for mode 2 enhancement", ITL, 3GPP TSG RAN WG1 #104-e R1-2101409, Feb. 5, 2021, 7 pages.

"Reliability and Latency Enhancements for Mode 2", Qualcomm Incorporated, 3GPP TSG RAN WG1 #104-e R1-2101910, Feb. 5, 2021, 23 pages.

"Discussion on Mode 2 enhancements", MediaTek Inc* , 3GPP TSG RAN WG1 #104-e R1-2101926, Feb. 5, 2021, 9 pages.

* cited by examiner

INTER-UE COORDINATION SIGNALING FOR SIDELINK COMMUNICATION

PRIORITY CLAIM

This application is a U.S. National Stage Filing under 35 U.S.C. 371 from International Application No. PCT/US2022/022495, filed Mar. 30, 2022 and published in English as WO 2022/212465 on Oct. 6, 2022, which claims the benefit of priority to U.S. Provisional Patent Application Ser. No. 63/169,707, filed Apr. 1, 2021, U.S. Provisional Patent Application Ser. No. 63/169,710, filed Apr. 1, 2021, and U.S. Provisional Patent Application Ser. No. 63/169,781, filed Apr. 1, 2021, each of which is incorporated herein by reference in its entirety.

TECHNICAL FIELD

Embodiments pertain to fifth generation (5G) wireless communications. In particular, some embodiments relate to sidelink communications in 5G networks.

BACKGROUND

The use and complexity of wireless systems, which include $4^{th}$ generation (4G) and $5^{th}$ generation (5G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) or new radio (NR) systems. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
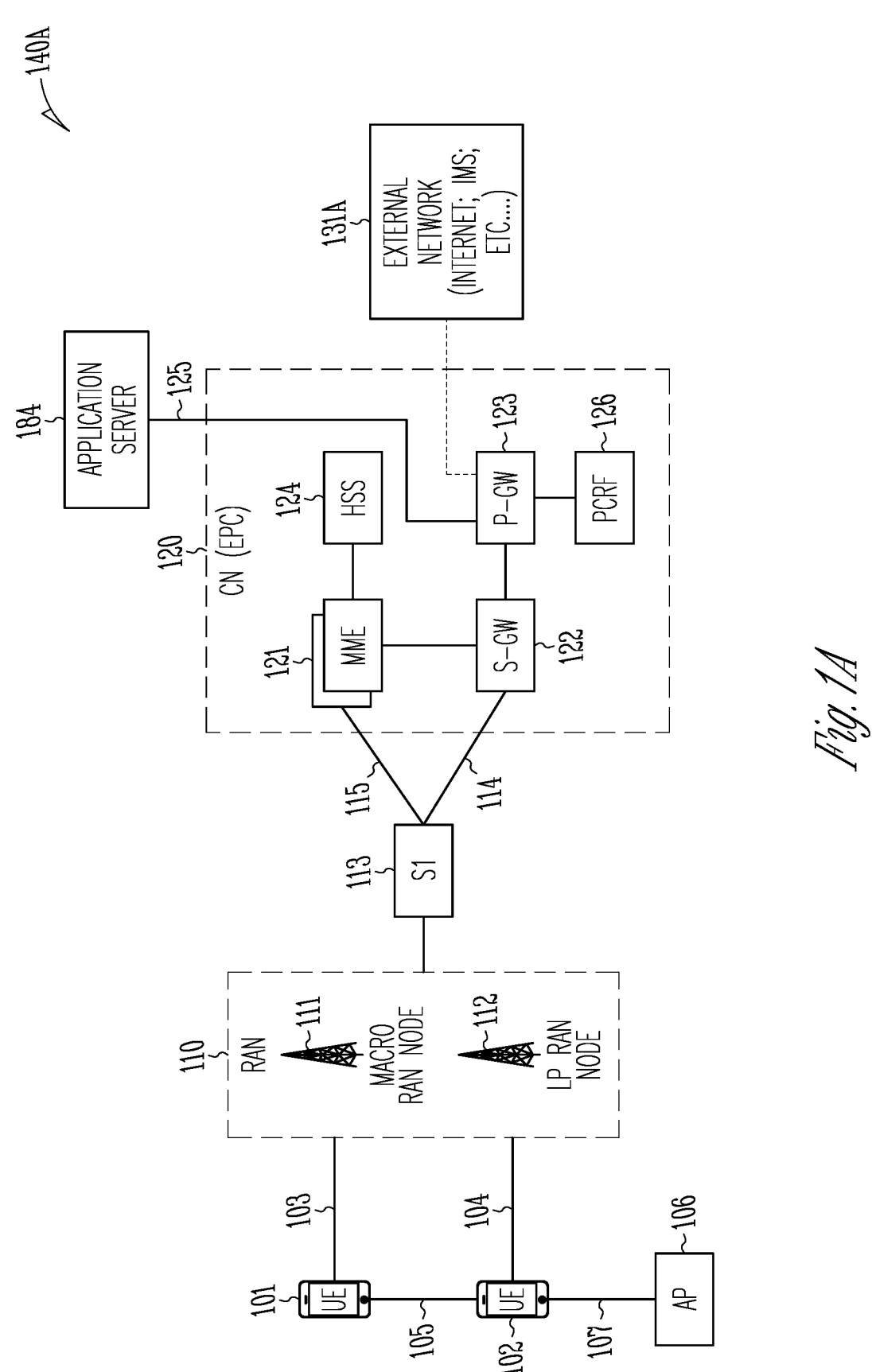
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G network core (5GC) 120. The NG-RAN 110 can include a plurality of nodes, such as gNBs and NG-eNBs. The core network 120 (e.g., a 5G core network/5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
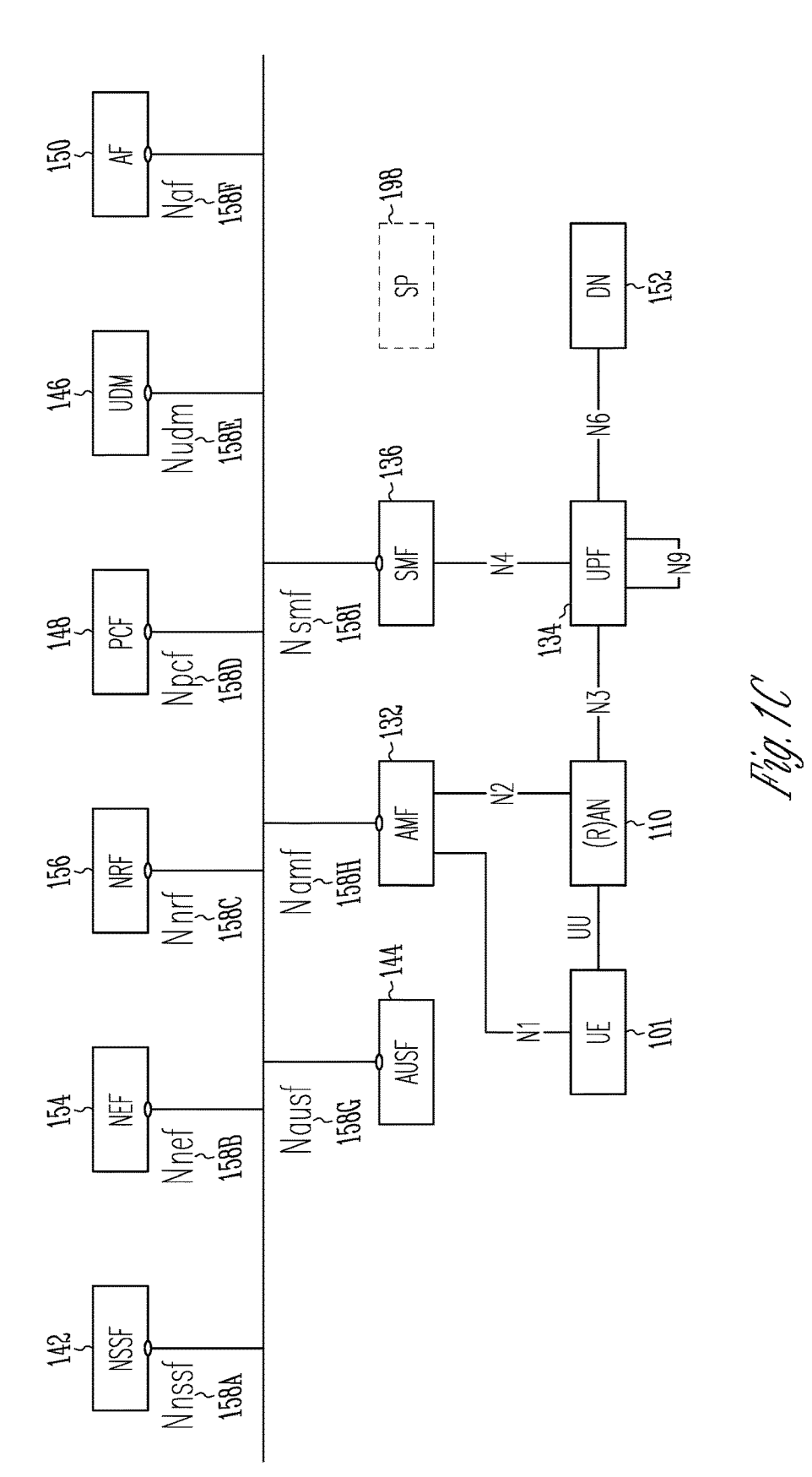
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
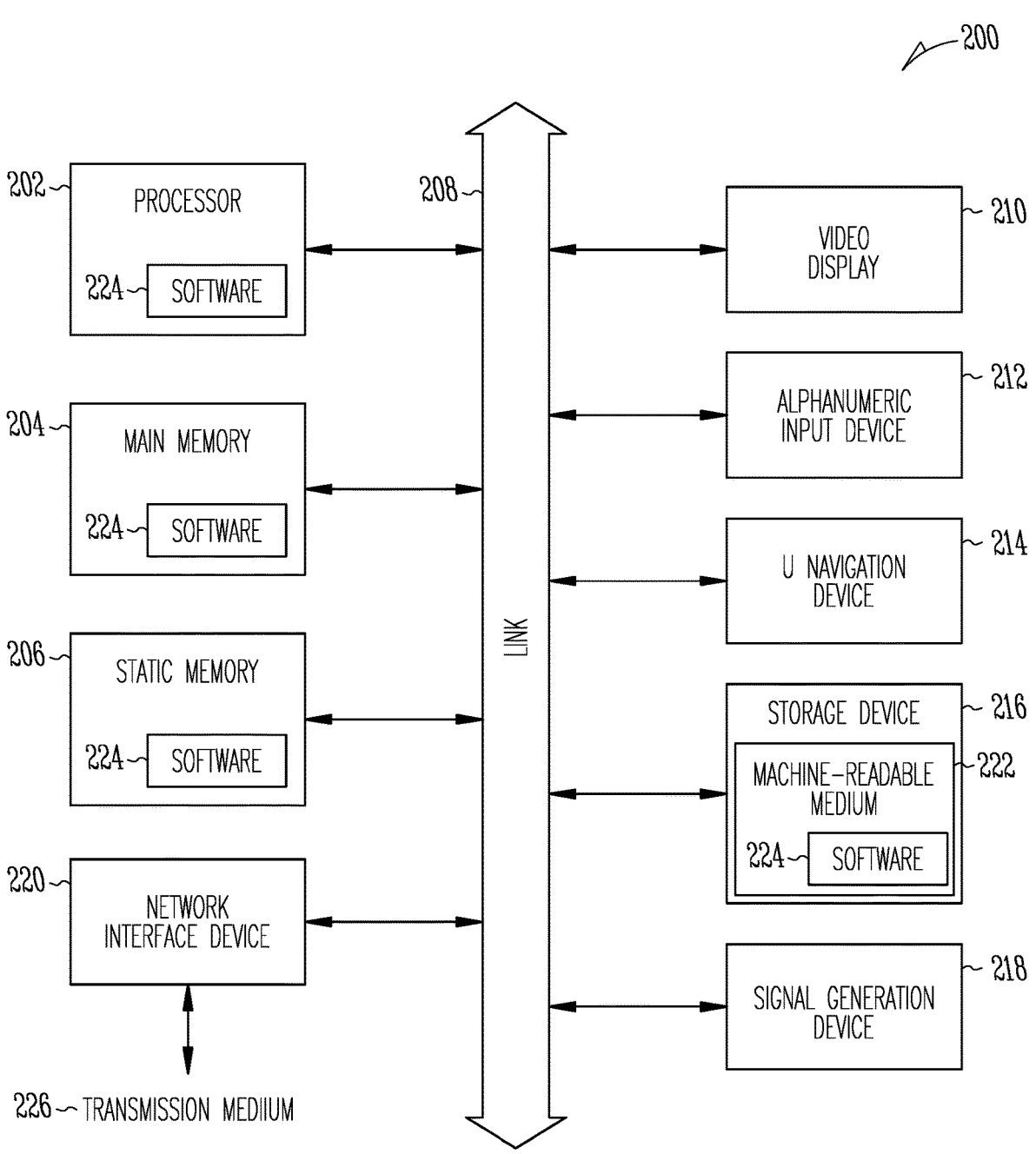
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (WITS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (any-thing) (V2X) and Vehicle-to-Infrastructure (V2I) and Infra-structure-to-Vehicle (I2V) communication technologies, 3GPP cellular V2X, DSRC (Dedicated Short Range Com-munications) communication systems such as Intelligent-Transport-Systems and others (typically operating in 5850 MHz to 5925 MHz or above (typically up to 5935 MHz following change proposals in CEPT Report 71)), the Euro-pean ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applica-tions in the frequency range 5,855 GHz to 5,875 GHz), ITS-G5C (i.e., Operation of ITS applications in the fre-quency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spec-trum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global des-ignation for Multi-Gigabit Wireless Systems (MGWS)/Wi-Gig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular appli-cations, specific applications for vertical markets may be addressed such as PMSE (Program Making and Special Events), medical, health, surgery, automotive, low-latency, drones, etc. applications.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corre-sponding symbol resources.

Some of the features in this document are defined for the network side, such as APs, eNBs, NR or gNBs—note that this term is typically used in the context of 3GPP fifth generation (5G) communication systems, etc. Still, a UE may take this role as well and act as an AP, eNB, or gNB; that is some or all features defined for network equipment may be implemented by a UE.

As noted above, among V2X communications may be used between a vehicular UE (e.g., UE in a vehicle) and another vehicular UE (V2V), infrastructure (V2I), or any communication entity (V2X). Due to the desire for self-driving vehicles, for example, high reliability and low latency of sidelink V2X communications are critical key performance indicators (KPIs) for NR V2X systems. In NR Rel.17, inter-UE coordination methods may provide sidelink reliability enhancements to enable low latency and high reliability for the future generation of NR V2X systems.

In general, UEs may transmit sidelink data in either unicast (UE to UE), groupcast (UE to specified group), broadcast mode (UE to everything). The UEs may use a control channel to reserve sidelink resources for future retransmissions of a particular transport block (TB). The UEs may monitor the sidelink control channel in each slot and perform a sensing procedure by decoding control chan-nel transmissions from other UEs and measuring the sidelink reference signal receive power (SL-RSRP). The sidelink resources selected for transmission are determined based on results of a sensing and resource (re)-selection procedure aiming to avoid collision among UEs. The UEs may use the sidelink feedback channel introduced for hybrid acknowl-edgment request (HARD) operation for unicast and group-cast communication.

The procedures of UE-autonomous sensing and resource (re)-selection defined in Rel.16 provide performance benefits over random resource (re)-selection. However, additional specific enhancements to further improve reliability of NR V2X sidelink communication by means of low latency inter-UE coordination feedback signaling may be desirable. Inter-UE coordination signaling can help to increase reliability by reducing the negative performance impact due to half-duplex and co-channel collision events in Rel.16 NR-V2X communication systems. Different sidelink conflicts such as half-duplex and co-channel collisions are distinguished herein.

Half-duplex and Co-channel Collision Sidelink Conflicts:

Half-duplex $UE_P$ has a half-duplex event with $UE_Q$ if $UE_P$ is a target receiver (RX) of $UE_Q$ (e.g., $UE_P$ is a member of the $UE_Q$ group) and may not be able to receive transmissions from $UE_Q$ due to its own transmission. The following half-duplex conflicts can be distinguished:

Half-duplex in transmission (HD-TX): The $UE_P$ and $UE_Q$ have already transmitted in the same sidelink slot (on overlapped or non-overlapped resources in frequency). This type of collision can be addressed by introducing new inter-UE coordination signaling.

Half-duplex in reception (HD-RX): The $UE_P$ reserved a resource for transmission to the $UE_Q$ in slot 'n'. The $UE_Q$ is scheduled for a more prioritized uplink (UL) or sidelink (SL) transmission and thus cannot receive transmission from the $UE_P$ on the reserved resource in slot 'n'. This type of conflict can be partially addressed by introducing new inter-UE coordination signaling if the inter-UE coordination signaling can be received before transmission on the reserved resource.

Half-duplex in resource selection (HD-SLCT): The $UE_P$ and $UE_Q$ have a selected resource for transmission in the same slot (on overlapped or non-overlapped resources in frequency). This type of conflict can be partially addressed by the (re)-evaluation procedure defined in Rel.16 if the reservation for selected resources has not been done yet by one of the UEs and there is enough processing delay to reselect the resource.

Half-duplex in resource reservation (HD-RSV): The $UE_P$ and $UE_Q$ have a reserved resource for transmission in the same slot (on overlapped or non-overlapped resources in frequency). This type of conflict can be addressed by introducing new inter-UE coordination signaling.

Use of half-duplex communications may significantly degrade performance of sidelink reception for other RX UEs as, if both the $UE_P$ and $UE_Q$ transmit on overlapping frequency resources (co-channel collision), both transmissions will not be decodable.

Co-Channel Collision

The $UE_P$ has co-channel collision with the $UE_Q$ if the $UE_P$ and $UE_Q$ transmit on overlapping frequency or time resources. The following co-channel collision types can be distinguished:

Co-channel collision in transmission (CC-TX): In this case, the TX UEs ($UE_P$ and $UE_Q$) have already transmitted in the same sidelink slot on overlapping frequency resources (full or partial overlap).

Co-channel collision in resource selection (CC-RS): In this case, the TX UEs ($UE_P$ and $UE_Q$) have selected a resource for transmission in the same slot on overlapping frequency resources (full or partial overlap). This event may not be detectable unless one of TX UEs has already made a resource reservation.

Co-channel collision in resource reservation (CC-RSV): In this case, the TX UEs ($UE_P$ and $UE_Q$) have reserved resources for transmission in the same slot on overlapping frequency resources (full or partial overlap).

The sidelink conflicts described above are considered from a single TX UE perspective.

The half-duplex and co-channel collisions may occur on resources used for either initial transmission of a TB, retransmission of the TB, or various combinations from TX UE perspective: Combination-A: Resources used for initial transmission of a TB by the $UE_P$ and $UE_Q$; Combination-B: Resources used for retransmissions of a TB by the $UE_P$ and $UE_Q$; Combination-C: Resource used for initial transmission of a TB by the $UE_P$ and resource carrying retransmission of a TB by the $UE_Q$.

The two co-channel collision types exist in the Rel.16 V2X design: Type-1 (Hidden Node), Type-2 (Simultaneous Access), and Type-3. (Congested Medium).

Figure 3:
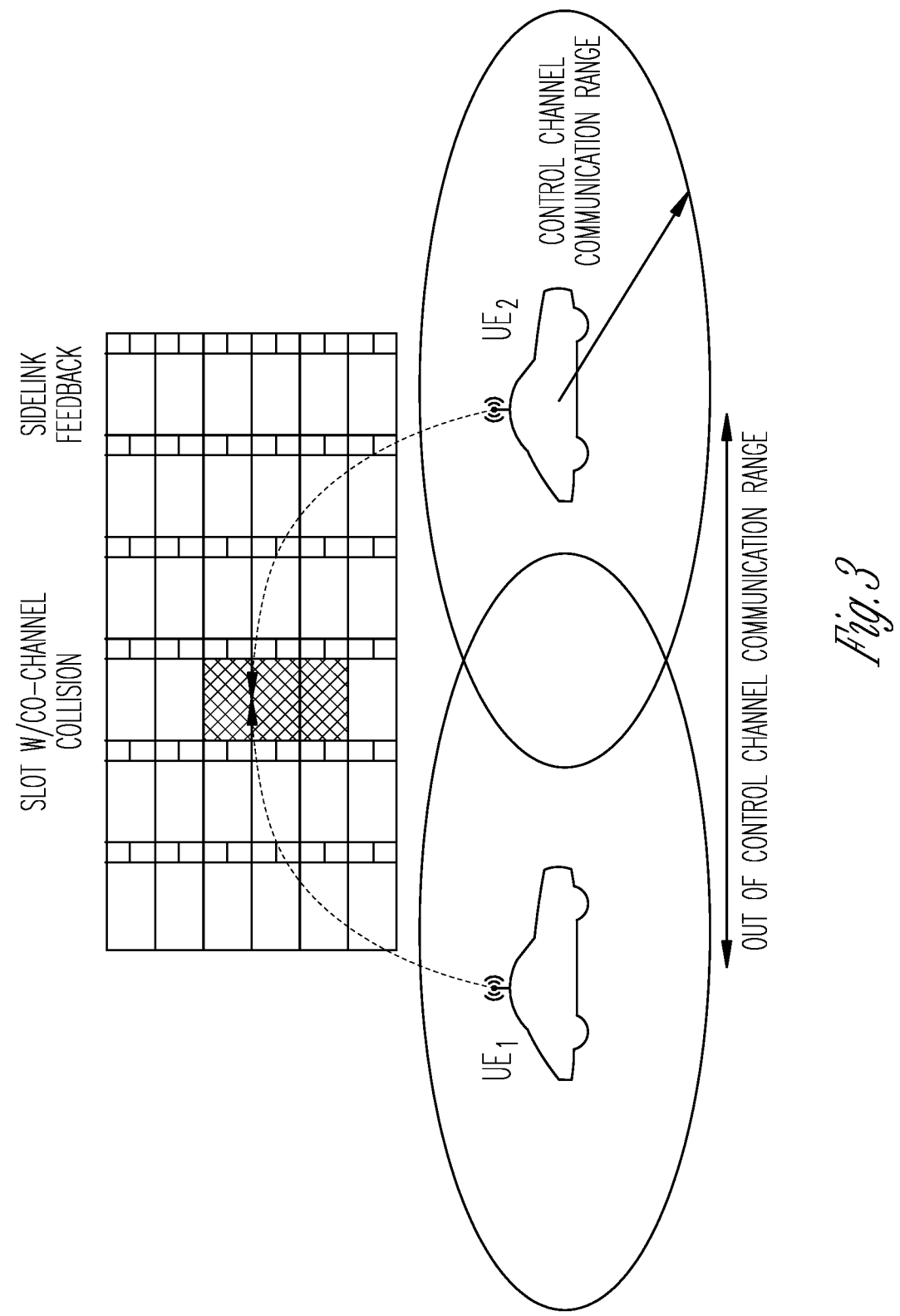
FIG. 3 illustrates a Type-1 hidden node collision in accordance with some embodiments.

Type-1 (Hidden Node): Cochannel collisions due to hidden node problem. Transmitting UE(s) are out of communication range from each other (i.e., cannot sense each other) but within communication range of a RX UE. FIG. 3 illustrates a Type-1 hidden node collision in accordance with some embodiments.

Figure 4:
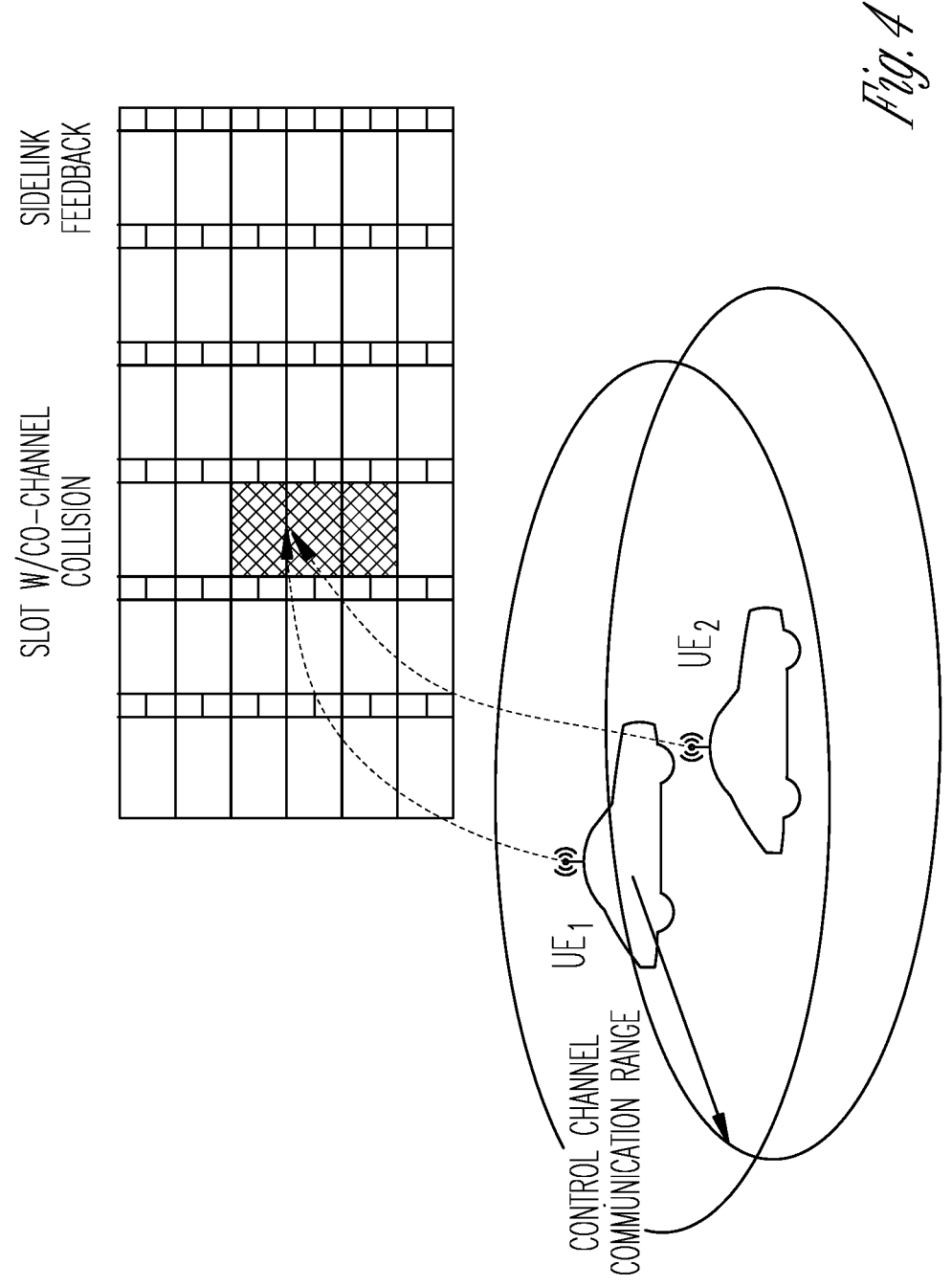
FIG. 4 illustrates a Type-2 simultaneous access collision in accordance with some embodiments.

Type-2 (Simultaneous Access): Co-channel collisions due to simultaneous resource (re)-selection caused by processing time delay or lack of sensing data due to sidelink transmissions, etc. In this case, the transmitting UEs are within communication range from each other (i.e., it is feasible to sense each other), however simultaneously perform resource (re)-selection and access the channel in the same slot on overlapping resources. FIG. 4 illustrates a Type-2 simultaneous access collision in accordance with some embodiments.

Type-3. (Congested Medium): Co-channel collisions due to lack of unoccupied resources (high medium congestion). Here, the TX UEs are within communication range from each other (i.e., can sense each other), however access to the channel is congested (resources are occupied) and a UE selects an occupied resource within the set of resources with minimum RX power level. In this case, collisions are not avoidable thus congestion control mechanisms should be used to reduce the rate of collisions.

List of Inter-UE Coordination Solutions for Mode-2 Resource Allocation Enhancements As above, inter-UE coordination feedback and signaling may help to mitigate the following conflicts of NR-V2X sidelink communication: Half-duplex in transmission (HD-TX); Half-duplex in reservation (HD-RSV); Half-duplex in reception (HD-RX); Co-channel collision in transmission (CC-TX); and Co-channel collision in reservation (CC-RSV). To address these conflicts by inter-UE coordination, low latency sidelink feedback signaling is introduced. The inter-UE coordination framework comprises the following design components: methods to determine sidelink collisions and half-duplex conflicts for reliable sidelink communication with inter-UE coordination feedback, including conditions to determine half-duplex and co-channel collision by RX UEs; methods to prioritize inter-UE coordination feedback for reliable sidelink communication with inter-UE coordination feedback, including UL, SL HARQ, SL half-duplex/co-channel, and SL priority; methods to determine UEs for inter-UE coordination feedback, including use of distance, RSRP, detection of half-duplex/co-channel collision events; methods to determine inter-UE coordination feedback timing for reliable sidelink commu-
nication, including which slots to use for indication signal-
ing and new processing times for inter-UE coordination;
methods to determine sidelink half-duplex and collision
events by transmitting UEs and enhanced resource re-
selection procedures, including UE autonomous detection of
half-duplex and co-channel collisions and TX UE behaviors
in terms of resource allocation; methods to determine
resources for sidelink transmission for inter-UE coordina-
tion feedback; and methods of inter-UE coordination feed-
back signaling for reliable sidelink communication.

Figure 5:
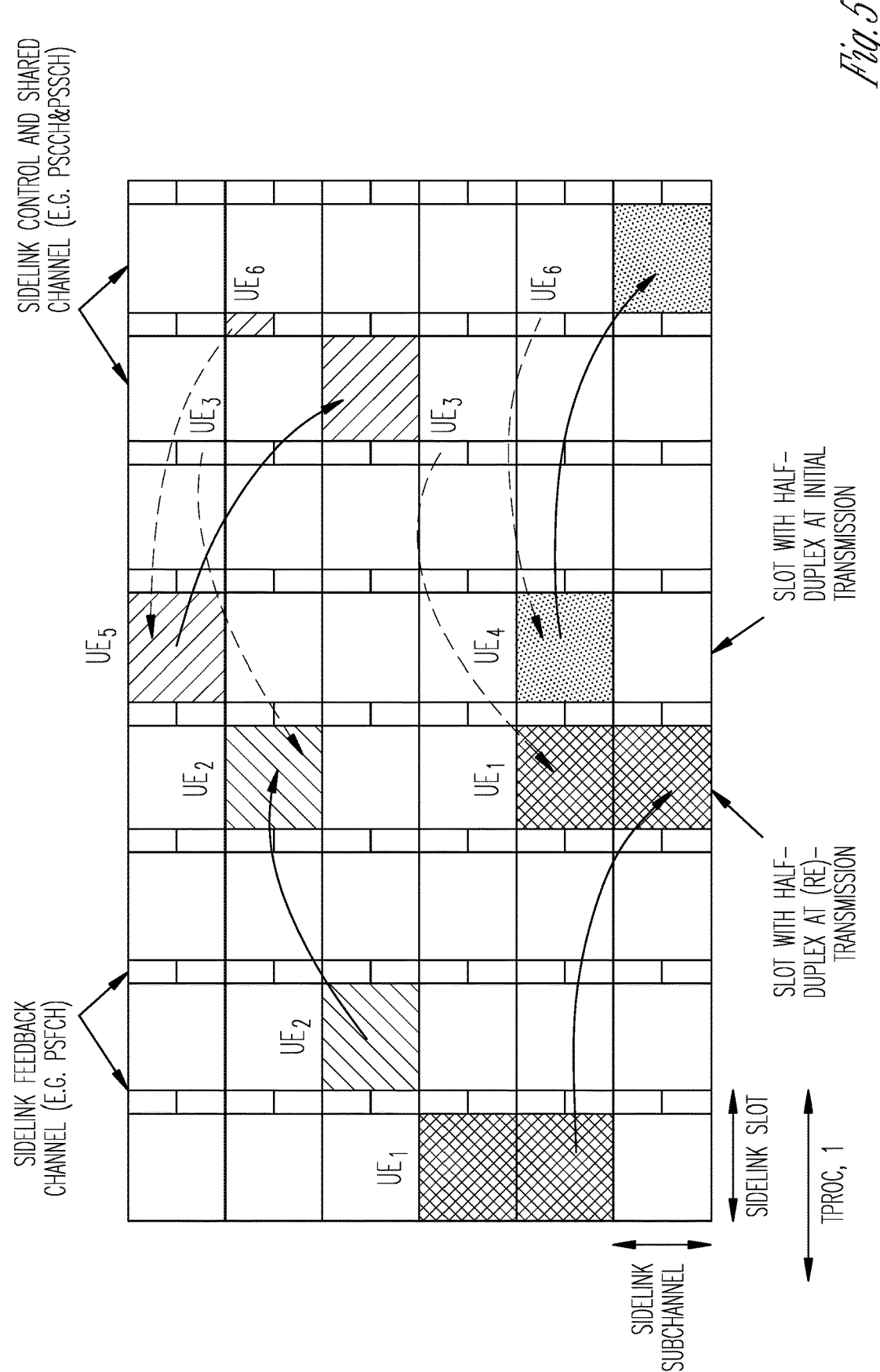
FIG. 5 illustrates half-duplex transmission with inter-UE coordination feedback in accordance with some embodiments.

Various figures illustrate problems of NR sidelink com-
munications addressed in the above. FIG. 5 illustrates half-
duplex transmission with inter-UE coordination feedback in
accordance with some embodiments. FIG. 5 illustrates con-
flicts of half-duplex in transmission and includes (A) On
Reserved Resources for Retransmission; and (B) On
Resources for Initial Transmission. In particular, as shown
UE1 and UE2 have half-duplex in resources used for re-
transmission of TBs. UE3 provides feedback to UE1 and
UE2 indicating half-duplex in transmission and potential
need for additional retransmissions. In addition, UE4 and
UE5 have half-duplex on resources used for initial trans-
mission of a TB. UE6 provides feedback to UE4 and UE5
indicating half-duplex in initial transmission and potential
need for additional retransmissions.

Figure 6:
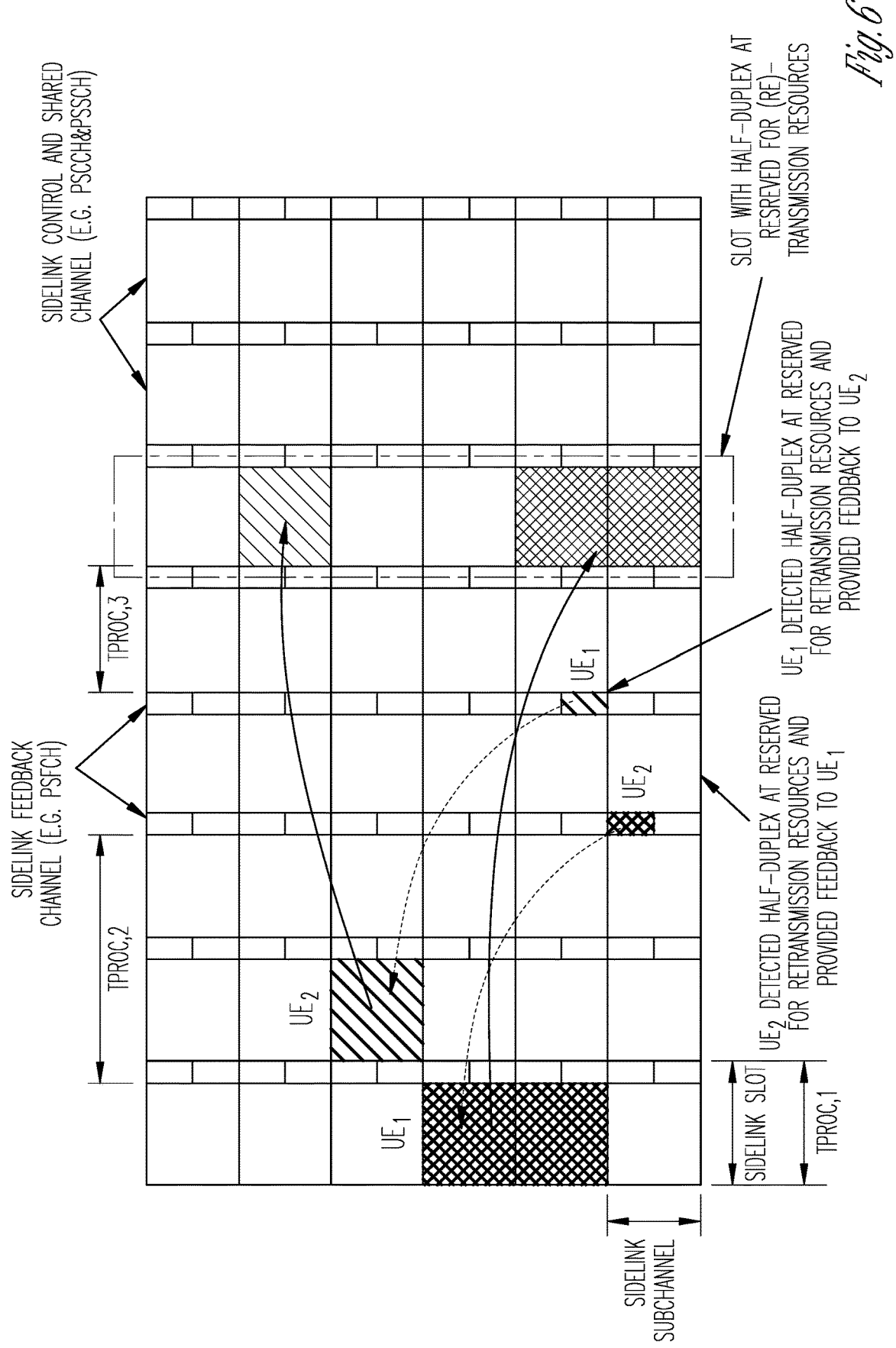
FIG. 6 illustrates half-duplex in resource reservation with inter-UE coordination feedback in accordance with some embodiments.

FIG. 6 illustrates half-duplex in resource reservation with
inter-UE coordination feedback in accordance with some
embodiments. FIG. 6 illustrates conflicts of half-duplex in
reservation. In particular, UE1 and UE2 have half-duplex in
reserved resources planned for re-transmission of TBs. UE3
provides feedback to UE1 and UE2 indicating half-duplex in
reservation and potential need for resource (re)-selection.

Figure 7:
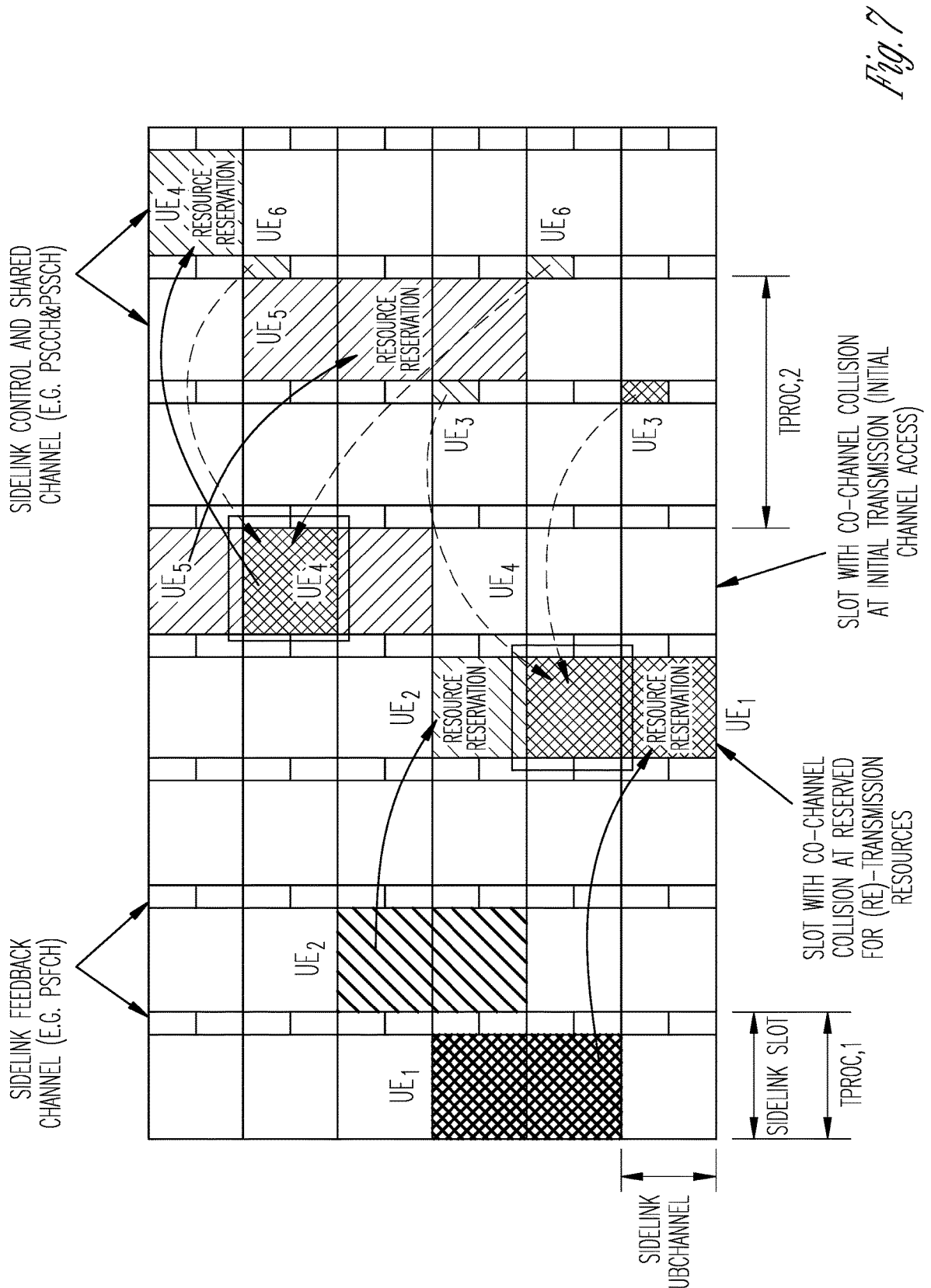
FIG. 7 illustrates co-channel collision in transmission with inter-UE coordination feedback in accordance with some embodiments.

FIG. 7 illustrates co-channel collision in transmission
with inter-UE coordination feedback in accordance with
some embodiments. FIG. 7 illustrates conflicts of co-channel
collision in transmission. In particular, UE1 and UE2 have
co-channel collision in resources used for re-transmission of
TBs. UE3 provides feedback to UE1 and UE2 indicating
co-channel collision in transmission and potential need for
additional retransmissions. In addition, UE4 and UE5 have
co-channel collision on resources used for initial transmis-
sion of a TB. UE6 provides feedback to UE4 and UE5
indicating co-channel collision in initial transmission and
potential need for additional retransmissions.

Figure 8:
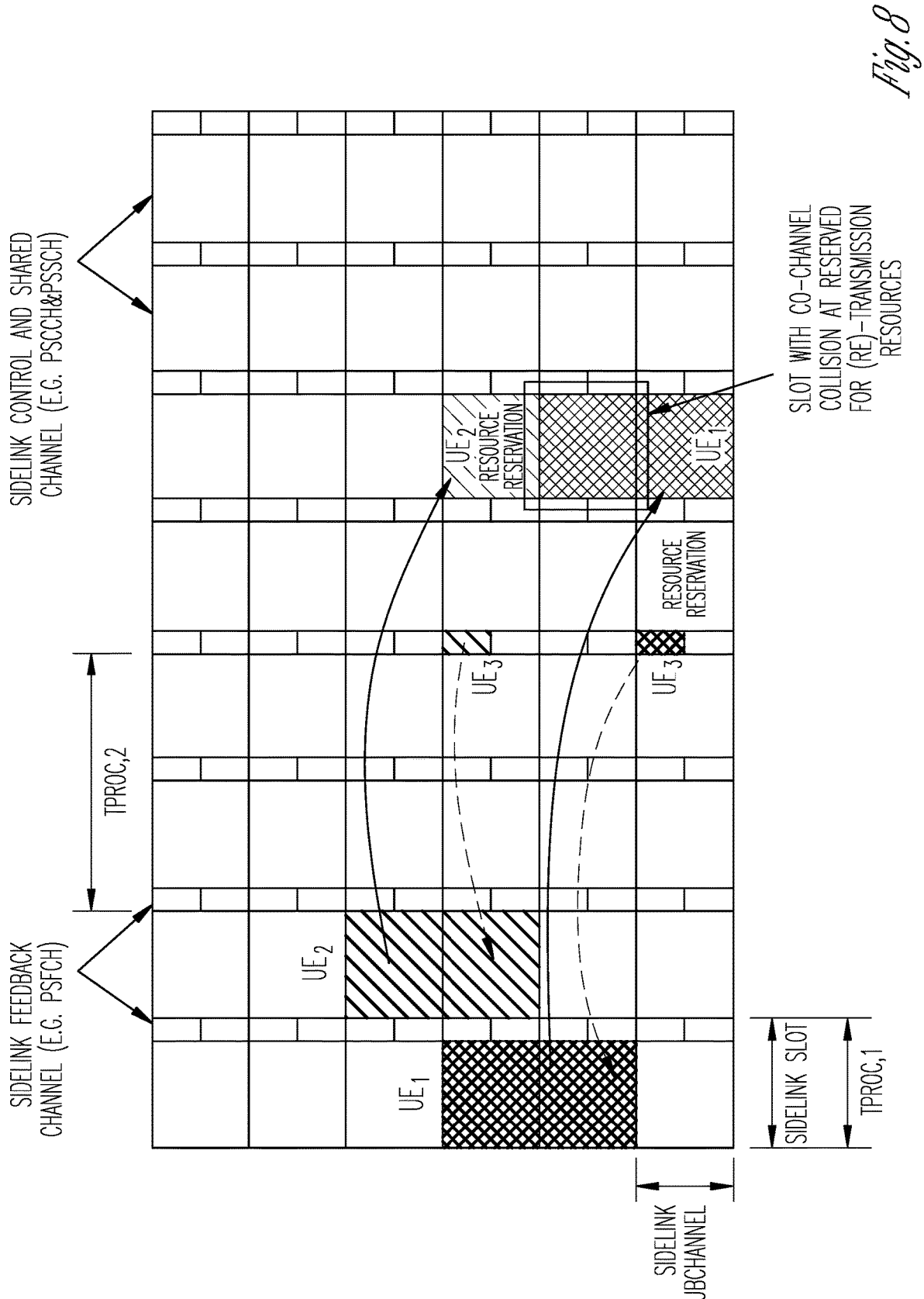
FIG. 8 illustrates co-channel collision in reservation with inter-UE coordination feedback in accordance with some embodiments.

FIG. 8 illustrates co-channel collision in reservation with
inter-UE coordination feedback in accordance with some
embodiments. FIG. 8 illustrates conflicts of co-channel
collision in reservation. In particular, UE1 and UE2 reserved
overlapped resources for re-transmission of TBs. UE3 pro-
vides feedback to UE1 and UE2 indicating co-channel
collision in reservation and potential need for resource
(re)-selection or retransmissions.

Inter-UE coordination signaling can thus be used to
address the above problems of sidelink communication. To
ensure low latency feedback for inter-UE coordination sig-
naling, two processing times are introduced: physical shared
control channel reception to physical sidelink feedback
channel transmission (PSCCH RX-to-PSFCH TX) process-
ing time ($T_{proc\_x}$) and PSCCH, RX-to-PSFCH TX yielding
time. The PSCCH RX-to-PSFCH TX processing time is the
time used for half-duplex/collision detection through
PSCCH/sidelink control information (SCI) processing (in-
cluding sidelink measurements)+PSFCH preparation time
for feedback transmission. The PSCCH RX-to-PSFCH TX
yielding time is the time used for PSFCH processing to
detect inter-UE coordination feedback for half-duplex/collision events+resource (re)-selection/(re)-evaluation time for
the PSCCH/PSSCH. The SCI is carried in the PSCCH.
PSCCH RX-to-PSFCH TX Processing Time ($T_{proc\_x}$)

Figure 9:
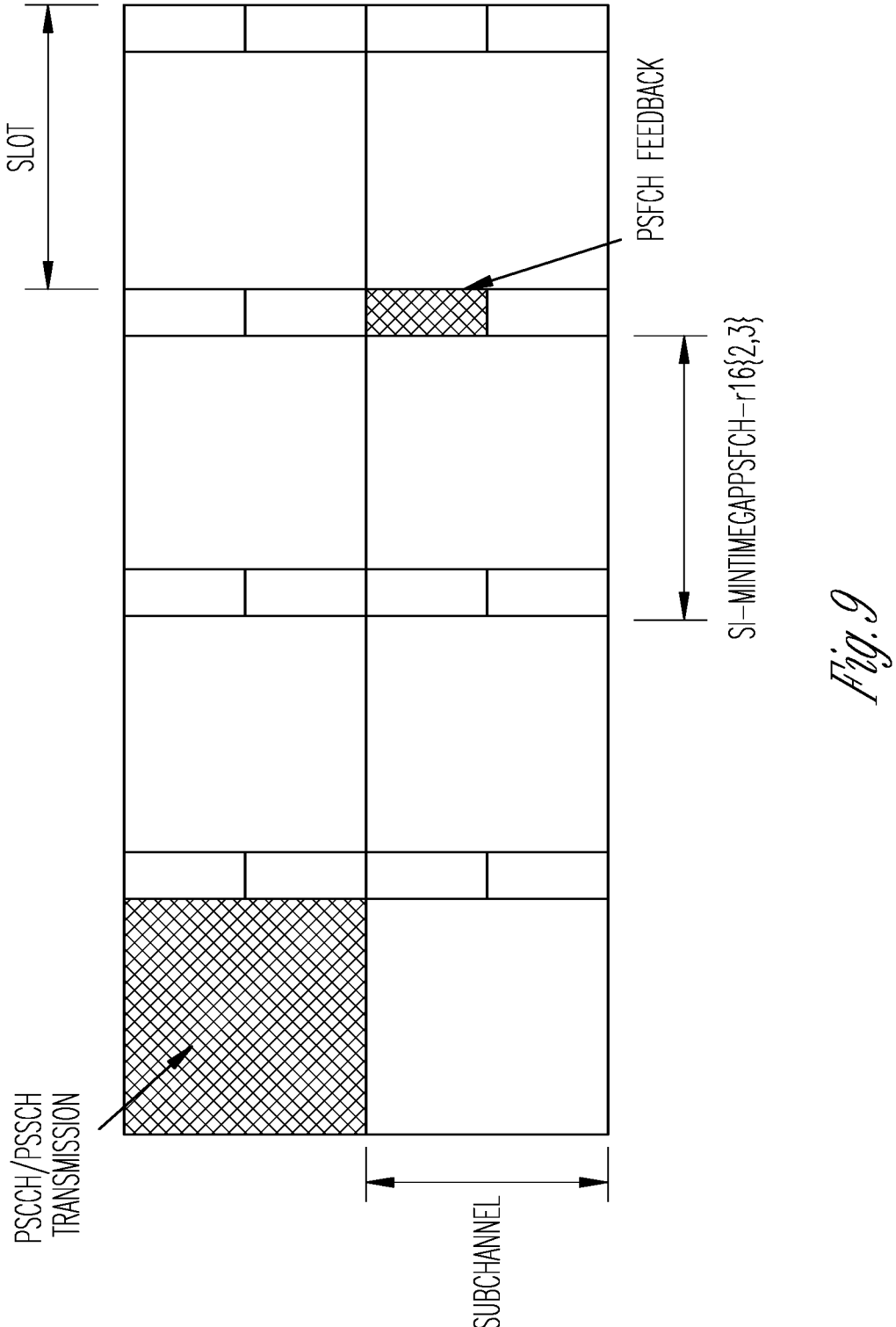
FIG. 9 illustrates a physical sidelink feedback channel (PSFCH) time gap in accordance with some embodiments.

This processing time determines the minimum PSCCH/
SCI RX processing time+PSFCH preparation time. In
Rel.16, the total PSCCH/PSSCH RX+PSFCH preparation
time was discussed to support HARQ operation. There was
no specific UE processing time introduced, however, and it
was agreed that the minimum time gap for PSFCH HARQ
feedback is controlled by higher layer parameter: sl-MinTi-
meGapPSFCH-r16 {2, 3} slots. This gap was used to define
PSFCH HARQ transmission timing with respect to the slot
carrying the associated PSSCH transmission. FIG. 9 illus-
trates a PSFCH time gap in accordance with some embodi-
ments.

Considering that for inter-UE coordination feedback the
PSSCH decoding is not required, the various options can be
considered. In a first option, a new PSCCH RX processing
to PSFCH TX time may be defined for inter-UE coordina-
tion signaling. Introduction of the new processing time
allows the feedback to be delivered with the reduced (mini-
mum) latency, but is inconsistent with legacy (Rel.16) UE
behavior if HARQ ACK/NACK signaling is used (given that
timing of this signaling depends on sl-MinTimeGapPSFCH-
r16) and the HARQ ACK/NACK feedback may come later
i.e., after inter-UE coordination feedback. The first option
can still be beneficial if the feedback on half-duplex or
collision is provided to a Rel.17 TX UE, at least for
half-duplex in transmission/reservation events.

In a second option, the Rel.16 PSFCH time gap mecha-
nism may be extended. This may provide a common behav-
ior with Rel.16 UEs but the feedback latency is not opti-
mized. The first option has an advantage in terms
consistency/transparency and alignment with Rel.16 UE
behavior. However, if distinguishing between Rel.16 vs
Rel.17 TX UEs becomes possible, both alternatives can be
considered.
PSFCH RX-to-PSCCH/PSSCH TX Yielding Time ($T_{proc\_y}$)

This processing time determines the minimum time for
the feedback to be provided ahead of planned transmission
on reserved resource. In Rel.16, the $T_{proc,1}$ time is defined as
a maximum time to perform resource (re)-selection relative
to the slot of resource (re)-selection trigger. If the PSCCH
processing time is considered, then the sum of $T_{proc,0}$+
$T_{proc,1}$ can be used as an upper bound for $T_{proc\_y}$ In other
embodiments, instead of using upper bound, the new pro-
cessing time can be predefined and used to determine timing
for transmission of the inter-UE coordination feedback.

The feedback for half-duplex/collision events in reserva-
tion is mainly used to support yielding of transmission on the
reserved resource. From a yielding perspective, the func-
tionality is similar to a preemption check, therefore the
processing time for $T_{proc\_y}$ can be reused from preemption
framework. In particular, $T_{proc\_y}$ can be equal to T3, which
is in turn equal to $T^{SL}_{proc,1}$:

TABLE 8.1.4-2

| $T^{SL}_{proc,1}$ depending on sub-carrier spacing | |
|---|---|
| $\mu_{SL}$ | $T^{SL}_{proc,1}$ [slots] |
| 0 | 3 |
| 1 | 5 |
| 2 | 9 |
| 3 | 17 |

In addition, an offset of X symbols or slots can be defined with respect to $T^{SL}_{proc,1}$, i.e. $T_{proc,y}=T^{SL}_{proc,1}+X$, where X can be a negative integer, zero, or a positive integer.

The indication of half-duplex or collision in reservation events should be sent at least $T_{proc,y}$ time ahead of planned transmission in reserved slot 'k' with the detected half-duplex/collision in resource reservation, otherwise the indication should not be sent and can be handled in the same way as half-duplex/collision in transmission. In other words, feedback for half-duplex/collision in transmission can be considered as a fallback procedure for half-duplex/collision in reservation if it is not feasible for the $UE_R$ to provide feedback $T_{proc,y}$ time ahead of transmission on the reserved resource. The $T_{proc,y}$ can be also used to determine timing (slot) for feedback on half-duplex/collision in transmission.

Figure 10:
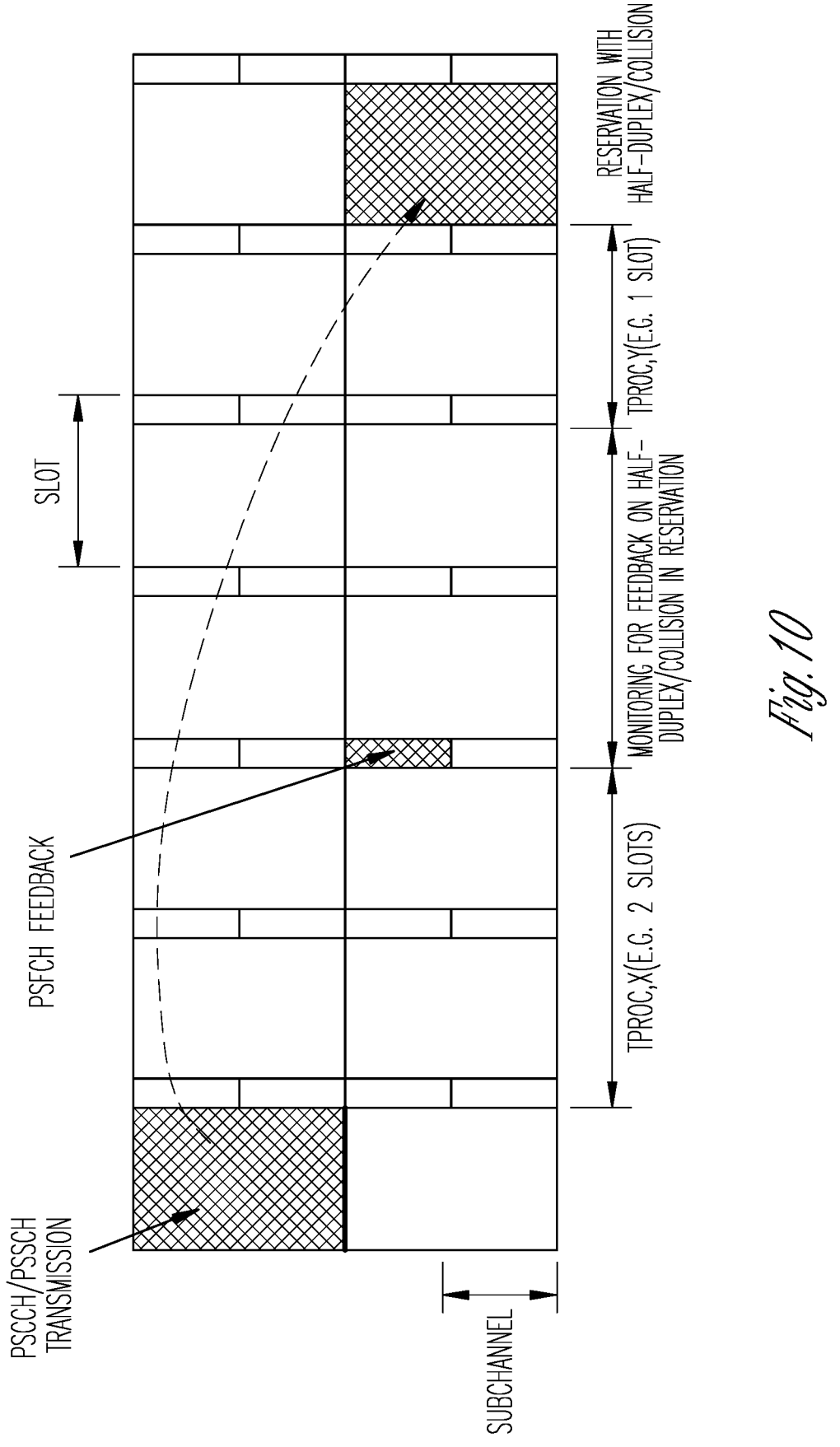
FIG. 10 illustrates a PSFCH timing option 1 in accordance with some embodiments.

Different TX UEs may announce reservations in different slots and reserve resources for transmission in the same slot. Therefore, various timing options for transmission of feedback can be analyzed. In a first option, the feedback may be transmitted relative to the slot where half-duplex/collision event was detected. FIG. 10 illustrates a PSFCH timing option 1 in accordance with some embodiments. Feedback timing is associated with the slot 'k', where sidelink transmission resulting in the half-duplex/collision event in reservation was observed by the RX UE ($UE_R$) (e.g., using the minimum fixed time gap ($T_{gap}$) to determine the earliest transmission in the time slot with PSFCH resources, i.e., after 'k+$T_{gap}$'). In this case if the $UE_P$'s transmission leads to half-duplex in reservation with the $UE_Q$, the $UE_R$ provides feedback to both the $UE_P$ and $UE_Q$ (subject to feedback generation rules) in the same slot. However, the $UE_Q$ may not be aware of the $UE_P$ transmission in slot 'k' and thus the feedback timing is not fixed from the $UE_Q$ perspective. The $UE_Q$ may monitor the feedback until the time-instance of the reserved resource—$T_{proc,y}$. Therefore, from a system perspective, each UE may monitor feedback in a window from the latest transmission until the earliest transmission in time reservation. In this case, the feedback is provided with minimum latency.

A second option uses a feedback monitoring window. In this case, the feedback monitoring window can be defined right after transmission in slot 'n' reserving resource in slot 'n+k', e.g. [n+$\Delta_1$, n+k−$\Delta_2$], where $\Delta_1$ and $\Delta_2$ are pre-defined/pre-configured subject to the following inequalities $\Delta_1 \geq T_{proc,x}$ and $\Delta_2 \geq T_{proc,y}$. This option provides more flexibility in terms of feedback timing at the cost of latency not being minimized and using multiple hypothesis testing at the TX UE for feedback reception. In this option, the PSFCH resource should be a function of the Source ID and slot index of the reserved resource (relative slot index). From technical perspective, this option may be feasible if the PSFCH physical structure for coordination indication is CRC-based, for example, since detection of this channel over other PSFCH transmissions may be unreliable in multiple slots hypotheses.

Figure 11:
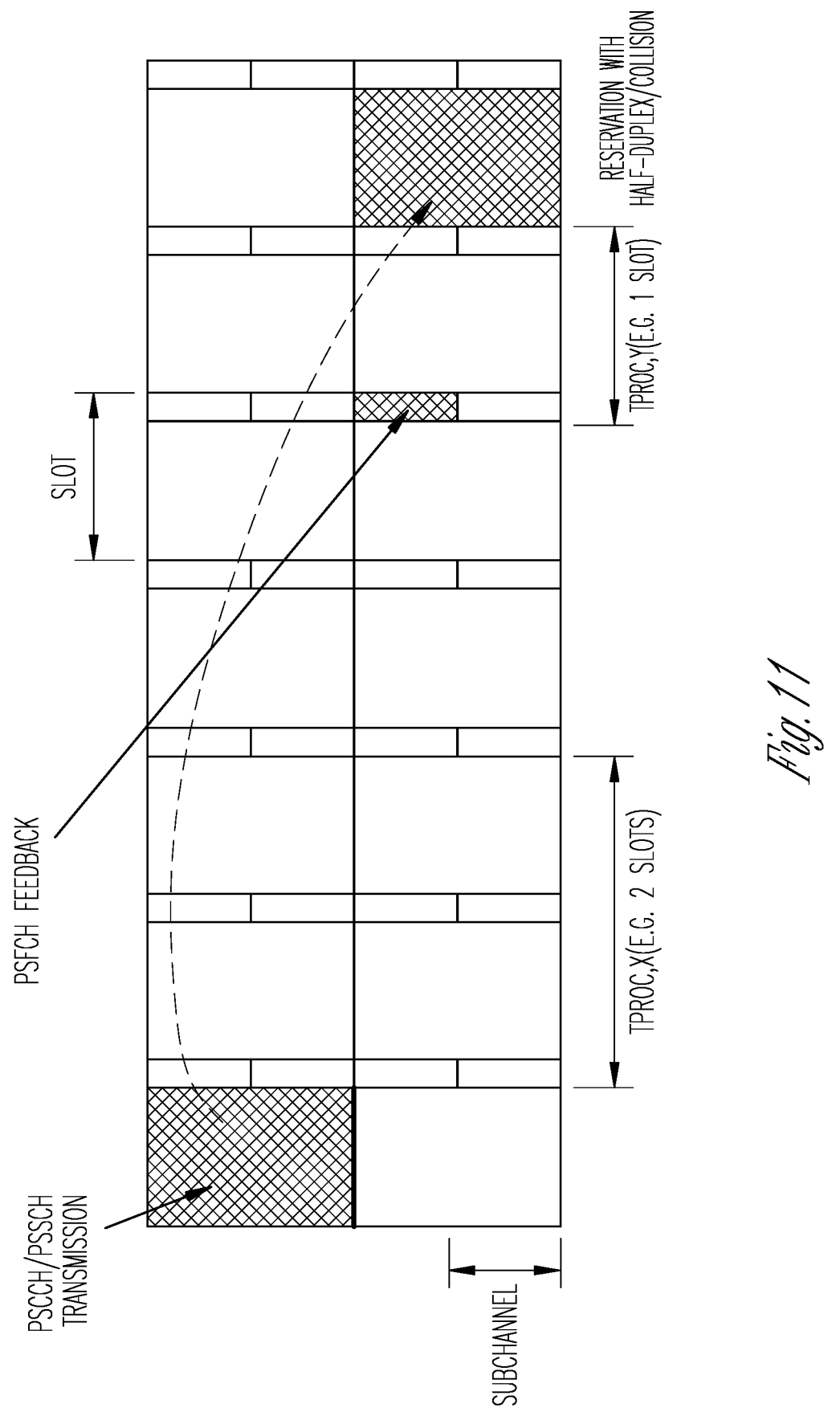
FIG. 11 illustrates a PSFCH timing option 3 in accordance with some embodiments.

A third option is relative to a slot with reserved resource (i.e., where half-duplex/collision in reservation is expected). FIG. 11 illustrates a PSFCH timing option 3 in accordance with some embodiments. To fix the timing, the timing may be defined with respect to the slot where the resource was reserved (i.e., transmitted with predefined time gap before the reserved resource). For example, feedback is provided in slot 'n+k−$\Delta_2$', where $\Delta_2$ is pre-defined or pre-configured and $\Delta_2 \geq T_{proc,y}$. In this case, $T_{proc,y}$ may not be explicitly defined, assuming that the $\Delta_2$ values are selected taking into account processing delays. This may be the most practical, as although the third option does not reduce feedback latency the third option avoids testing multiple hypothesis and thus can be recommended for practical implementation.\

Multiple Event Detection

The RX UEs ($UE_R$) may detect more than one event at each slot and may provide inter-UE coordination feedback to multiple TX UEs ($UE_P$ and $UE_Q$) in the same slot. At the same time, the $UE_R$ may have limited capabilities in terms of the maximum number of supported simultaneous inter-UE coordination feedback transmissions (e.g., the amount of simultaneous PSFCH transmissions for inter-UE coordination and/or HARQ feedback). Considering limitations in UE capability for feedback signaling, the RX UE may prioritize the feedback indication using predefined or pre-configured priority rules to determine the feedback for transmission.

The prioritization of inter-UE coordination signaling can be subject to the conditions that may include: priority of sidelink HARQ ACK/NACK signaling over half-duplex or co-channel collision indications, priority of UL transmission over SL transmission priority, distance or SL-RSRP (radio-distance) to TXs UEs, distance between TX UEs, group membership/provided service (destination ID), and random or implementation-based selection.

The priority of sidelink HARQ ACK/NACK signaling over half-duplex (in transmission/reservation) or co-channel collision (in transmission/reservation) indications may be based on the sidelink L1 priority of TX UEs ($UE_P$ and $UE_Q$). Various embodiments may be used:

In a first option, prioritization may be based on the associated sidelink L1 priority of TXs irrespective of whether the transmission is the HARQ feedback or feedback for half-duplex/co-channel collisions. In case of tie-breaking event, i.e., TXs have the same L1 priority, the prioritization can be based further as per the second or third option below.

In a second option, HARQ ACK/NACK or NACK only signaling may be prioritized over half-duplex/co-channel collision feedback indications. In one example, HARQ ACK/NACK>HD-TX/HD-RX>half-duplex in reservation (HD-RSRV)>CC-TX>Co-channel collision in reservation (CC-RSV) (where > indicates prioritization of the first transmission over the second transmission). In another example, HARQ ACK/NACK>HD-TX/HD-RX>CC-TX>HD-RSRV>CC-RSV. In another example, HARQ ACK/NACK>HD-TX/HD-RX==CC-TX==HD-RSRV==CC-RSV (where == indicates equal priority). In another example, HARQ ACK/NACK>HD-TX/HD-RX==HD-RSRV>CC-TX==CC-RSV. If UE R is the group member of $UE_P$ and/or $UE_Q$, it is expected to separately acknowledge reception status using HARQ signaling to the $UE_P$ and/or $UE_Q$.

In a third option, half-duplex/co-channel collision feedback indications are prioritized over HARQ ACK/NACK or NACK only feedback. In one example, HD-TX/HD-RX>HD-RSRV>CC-TX>CC-RSV>HARQ ACK/NACK or NACK only. In another example, HD-TX/HD-RX>CC-TX>HD-RSRV>CC-RSV>HARQ ACK/NACK or NACK only. In another example, HD-TX/HD-RX==HD-RSRV>CC-TX==CC-RSV>HARQ ACK/NACK or NACK only. In another example, HD-TX/HD-RX==CC-TX==HD-RSRV==CC-RSV>HARQ ACK/NACK or NACK only.

In a fourth option, a numerical offset with respect to L1 priority of the $UE_P$ or $UE_Q$ transmission can be defined, e.g., L1 priority indication=L1 priority TX UE+ offset, where the offset can be (pre-)configured per sidelink resource pool.

In a fifth option, a priority value for the feedback indication can be (pre-)configured.

For the second and third options, prioritization within half-duplex/co-channel collision indications can be based on sidelink L1 transmission priority of TX UEs ($UE_P$ and $UE_Q$), prioritization within HARQ ACK/NACK or NACK only indications can be based on sidelink L1 transmission priority of TX UEs. Which alternative to use may be pre-configurable or pre-defined. The first option may be pre-configured by default for consistency with legacy UE behaviors defined in Rel.16. In the above alternatives, the additional prioritization can be done for ACK and NACK signaling.

For prioritization of UL transmission over SL transmission: if the UE has limited capabilities and shares the TX chain or TX power budget between UL and SL transmissions, the UL transmission priority with respect to SL transmission priority (including feedback) may also be supported. In this case, prioritization rules for sidelink feedback should also consider priority of UL transmission over SL feedback transmissions.

For distance or SL-RSRP to TXs UEs: if RX UEs ($UE_R$) select between feedback indication towards the $UE_P$ and/or $UE_Q$ (assuming everything else being equal), then proximity criteria can be used to select a specific feedback for transmission. In this case, either distance or RSRP estimates to TX UEs can be used. For instance, the $UE_R$ may prioritize feedback towards the UE that is closer in distance or radio-distance. In this case, the distance may be derived from zone IDs and zone length L or from coordinate signaling by TX UEs. Radio-distance can be compared based on SL-RSRP measurements to TX UEs.

For distance between TX UEs: the distance between TX UEs may be derived from indicated SCI zone IDs and pre-configured zone length—L or from coordinate signaling by TX UEs if supported in Rel.17. Future releases might support direct SL positioning. Thus, information of the relative distance from the perspective of $UE_R$ might also be available.

For group membership/provided service (Destination ID): the $UE_R$ may prioritize feedback towards group members over feedback towards members of other groups. In this case, the $UE_R$ may use destination IDs to determine priority of the feedback.

For random or implementation-based selection: if all other conditions are equal (tie break), the UE can select the priority of the feedback randomly or based on an implementation specific algorithm. If prioritization rules for inter-UE coordination feedback are not defined, the UE may select the priority of the feedback randomly or based on an implementation specific algorithm.

The discussed above set of conditions can be used in any combination including cases when only a subset of the conditions is used to determine feedback for transmission. It is also possible that these rules and the related thresholds are function of UE measurements of the channel busy ratio (CBR) or channel occupancy ratio (CR).

EXAMPLES OF PRIORITIZATION RULES FOR INTER-UE COORDINATION FEEDBACK TRANSMISSION

Example 1: UL vs SL transmission priority (radio-interface priority)>Sidelink Feedback Type (SL HARQ vs half-duplex/collision indication)>Group membership>Sidelink L1 Priority of TX UEs>Distance to TX UEs>Distance b/w TX UEs>Random Selection.

Example 2: UL vs SL transmission priority (radio-interface priority)>Sidelink L1 Priority of TX UEs>Group membership>Distance to TX UEs>Distance b/w TX UEs>Random Selection.

Example 3: Sidelink L1 Priority Value>Group membership>Distance b/w TX UEs>RX distance to TX UEs>Random Selection.

In some cases, intra-UE feedback collision may occur. Based on principles of feedback resource selection, the $UE_R$ may transmit feedback to different TX UEs ($UE_P$ and $UE_Q$) in the same time and frequency resources. An additional tie breaking rule may be defined which feedback will be transmitted in this case. The prioritization rules for inter-UE coordination feedback transmission may then be reused.

The physical (L1) or higher layer (L2) signaling can be used to provide inter-UE coordination feedback for both the physical layer and higher layer inter-UE coordination signaling. One motivation behind physical layer signaling is to dynamically mitigate sidelink conflicts for a given TB transmission. Physical layer signaling may be more applicable to initial channel access, aperiodic traffic, and semi-persistent collisions. Higher layer inter-UE coordination signaling can facilitate more informed resource selection and aims to improve resource selection at a longer timescale. In addition, higher layer inter-UE coordination signaling may be more applicable to optimize resource allocation for periodic traffic.

In some embodiments, the $UE_R$ may filter out both dynamic and semi-persistent transmissions based on a periodicity field signaled in an SCI at the physical layer. The $UE_R$ may construct two or more candidate resource sets. The candidate resource sets can be generated considering different types of transmissions. Type-1 candidate resource sets include both dynamic and semi-persistent transmissions (Rel.16 behavior). Type-1 candidate resource sets may be used for resource selection for actual sidelink transmission. Type-2 candidate resource sets may be used for semi-persistent transmissions only (i.e., filtering out dynamic transmissions). Type-2 candidate resource sets may be used for generation of inter-UE coordination feedback using higher layer signaling. Type-3 candidate resource sets include semi-persistent transmissions and inter-UE coordination feedback. Type-3 candidate resource sets may be used for generation of inter-UE coordination feedback using higher layer signaling. Type-4 candidate resource sets include dynamic, semi-persistent transmissions, and inter-UE coordination feedback. Type-4 candidate resource sets may be used for resource selection for actual sidelink transmission.

Inter-UE Coordination Feedback Content

The coordinating UE may signal either: a set of candidate resources (i.e., resources that are recommended as candidates for selection and transmission by the coordinating UE) or a set of non-candidate resources (i.e., resources that are not recommended as candidates for transmission by the coordinating UE).

Reference Parameter Set for Generation of Candidate Resource Set

For construction of inter-UE coordination candidate resource set, the reference parameter set for candidate set construction based should be provided: Reference priority of TX, Reference resource size (e.g., subchannel size), Reference periodicity or periodicities for sidelink transmission, Reference SL-RSRP thresholds for exclusion, Percentage of candidate resources to be found, Resource selection window duration/configuration, Sensing window duration/configuration, and Congestion control related measurements.

The inter-UE coordination candidate resource set can be generated per each provided reference parameter set configuration, i.e., multiple sets can be found. Each generated candidate resource set is associated with reference time slot (time stamp-slot index/frame number). Part of the reference set parameters can be either pre-configured system-wide (e.g., a percentage of candidate resources to be found, s) or provided/negotiated by UEs directly (e.g., priority, periodicity, resource size).

Determination of Reference Parameter Set for Generation of Candidate Resource Set The reference parameter set may be:

Pre-configured/pre-defined: for example, the set of typical configurations is provided to all UEs as a reference configuration with at least one default configuration.

Requested by the UE(s): for example, the TX(s) asks target RXs or group members to provide the candidate resource set for one or more of the pre-configured reference set of configurations. Alternatively, the TX(s) requests coordinating UEs.

Determined by the coordinating UE(s): for example, the set may be provided by a target RX to a target TX together with the candidate resource set. The target RX determines reference parameters and uses the reference parameters for construction of the resource set. Alternatively, the coordinating UEs provide feedback, determine and use the reference parameters.

Types of Inter-UE Coordination Feedback Transmission

The types of feedback include broadcast, groupcast, and unicast. Every UE can use broadcast inter-UE coordination feedback for feedback generation subject to filtering conditions—e.g., distance or RSRP range from transmitter that provided inter-UE coordination feedback, priority, periodicity used for generation of candidate resource set. For groupcast inter-UE coordination feedback, every UE member of the group is a target recipient of the feedback. Additional filtering can be considered, such as distance or RSRP range from transmitter that provided inter-UE coordination feedback, priority, periodicity used for generation of candidate resource set. For unicast inter-UE coordination feedback, a report is expected to be used by the RX counterpart of the communication link. Different destination IDs can be used to support different cast-types of inter-UE coordination feedback.

Selection of UEs for Inter-UE Coordination Feedback Transmission

A probabilistic approach can be used to reduce intensity of feedback transmission per slot. The UEs providing feedback should be equally/uniformly provided across time. The following filtering mechanism can be applied to reduce amount of feedback transmissions: Distance range from TX UE; Radio-distance range (indicated by the Reference Signal Received Power (RSRP)) from TX UE; Probabilistic function of slot/frame index and source or destination IDs; Priority of transmission is higher than pre-configured threshold. In some embodiments, one or more of the criteria can be applied simultaneously.

Translation of Reference Set of Parameters to Actual Resource Selection Procedure Given that values of parameters from the reference set can be different from the actual parameters used for resource selection criteria, a set of pre-configured or pre-defined translation rules can be introduced. For instance, the resource size and/or priority rules can be considered.

Resource size rule: in some embodiments, the resource size (number of sub-channels) for actual transmission should be the same as the size of the reference resource used for candidate resource set generation; in other embodiments, the resource size for actual transmission can be less than or equal to the size of the reference resource used for candidate resource set generation. In some embodiments, the resource size for actual transmission can span multiple consecutive candidate resources within a slot.

Translation functions can be defined to perform conversion between candidate resource sets with different resource sizes, e.g., $R_{REF}$ and $R_{TX}$, where $R_{REF}$ denotes the reference resource size of the reference candidate resource set $S_{REF}$ ($R_{REF}$) and $R_{TX}$ denotes the resource size of the candidate resource set $S_{TX}(R_{TX})$ generated for resource selection and transmission.

$$S_{REF}(R_{REF})=f(S_{TX}(R_{TX})) \tag{1}$$

For example, if $S_{REF}(R_{REF})=\{R_{REF}\}$ resource of N sub-channels, and $R_{TX}$ resource has (N−1) subchannels, then $S_{TX}$ has two candidate resources for transmission: $S_{TX}$ $\{R_{TX,0}=\{0:(N-2)\}; R_{TX,0}=1:(N-1)\}$.

Priority rule: the UE can use the candidate resource set from inter-UE coordination feedback, if the priority of sidelink transmission is higher or equal to the priority value used for generation of the candidate resource set for inter-UE coordination feedback. If priority is considered, then the translation function takes priority value as additional argument:

$$S_{REF}(R_{REF},P_{REF})=f(S_{TX}(R_{TX},P_{TX})) \tag{2}$$

For example, if $S_{REF}(R_{REF})=\{R_{REF}\}$ resource of N sub-channels, and $R_{TX}$ resource has (N−1) subchannels, then $S_{TX}$ has two candidate resources for transmission: $S_{TX}$ $\{R_{TX,0}=\{0:(N-2)\}; R_{TX,0}=1:(N-1)\}$.

Feedback Overhead Considerations:

In some embodiments, only slot indexes are reported as candidate resources even if the reference resource does not occupy an entire slot (i.e., the reference resource includes all subchannels). In addition, or alternatively, one or more groupings of sub-channels for the reference resource (i.e., reference resource comprise M≥0 sub-channels) are considered.

Priority of Inter-UE Coordination Feedback Transmission

When higher layer signaling is used for transmission of inter-UE coordination feedback over the PSSCH, the sidelink transmission priority should be determined. Various options are possible in terms of priority when inter-UE coordination feedback is carried over the PSSCH.

In a first option, the priority of the inter-UE coordination feedback transmission can be pre-configured or pre-defined. Alternatively, a priority value can be provided as a part of a reference configuration and used for generation of a candidate resource set.

In a second option, the sidelink transmission priority of a TX UE waiting for feedback may be considered. In this case, the priority may be acquired from the set as max {sidelink transmission priority of TX UE, sidelink feedback priority}. The same value of priority is expected to be used for candidate resource set construction.

In a third option, the sidelink transmission priority of RX UE providing the feedback may be considered. In this case, the priority may be acquired from the set as max {sidelink transmission priority of RX UE, sidelink feedback priority}. The same value of priority is expected to be used for candidate resource set construction.

In a fourth option, the priority used for construction of the candidate resource set may be considered. In this case, the priority of inter-UE coordination feedback transmission can be derived from the reference parameters for construction of the candidate resource sets, i.e., the priority that was used for construction of the candidate resource set. The highest priority can be used if multiple candidate resource sets were constructed.

Use of Inter-UE Coordination Feedback by TX UEs

The use of inter-UE coordination feedback by TX UEs include different information, including assistance information, feedback for resource selection, and feedback for resource exclusion. In particular, if inter-UE coordination feedback is treated as assistance information, then how the inter-UE coordination feedback is used for resource selection/exclusion can be left up to UE implementation. For feedback for resource selection, inter-UE coordination feedback is treated as an information for resource selection (e.g., intersection of multiple candidate resource sets can be used as a final candidate resource set). For feedback for resource exclusion, inter-UE coordination feedback is treated as an information for resource exclusion and indicated resources are excluded from candidate resource set. Inter-UE coordination feedback can be considered by the TX UE to improve resource reselection and thus reliability of semi-persistent transmissions.

Thus, various UE behaviors are disclosed herein. For example, sidelink conflict classification and RX-based determination of sidelink conflicts as a part of sensing procedure are described. Signaling methods are described for RX-based feedback indicating sidelink conflicts to TX UEs. TX-based resource allocation enhancements are based on inter-UE coordination feedback. Priority assignment for inter-UE coordination feedback transmission is disclosed, including RX-based feedback transmission based on assigned priority rules and TX-based resource allocation enhancements based on inter-UE coordination feedback. Determination of the resource and/or slot for feedback transmission and TX-based resource allocation enhancements based on inter-UE coordination feedback are also described.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for user equipment (UE) configured for sidelink inter-UE coordination in a fifth-generation new radio (5G NR) network, the apparatus comprising: processing circuitry and memory, the processing circuitry configured to:

decode a physical sidelink feedback channel (PSFCH) received from a peer UE, the PSFCH comprising inter-UE coordination information;

decode a sidelink control information (SCI) scheduling a physical sidelink shared channel (PSSCH) reception from the peer UE;

select, based on the inter-UE coordination information, resources for transmitting Hybrid Automatic Repeat request (HARQ-ACK) feedback in response to the PSSCH reception; and encode a PSFCH to include the HARQ-ACK feedback for transmission on the resources selected for transmitting the HARQ-ACK feedback, wherein to select the resources for transmitting the HARQ-ACK feedback, the processing circuitry is configured to exclude resources with potential conflicts from a resource set indicated by the inter-UE coordination information, wherein the processing circuitry is further configured to:

determine, based on the SCI, a set of resources that are reserved for the PSSCH reception;

determine conflict information for the set of resources that are reserved for the PSSCH reception; and encode a PSFCH for transmission to the peer UE, the PSFCH encoded to provide the conflict information to the peer UE.

2. The apparatus of claim 1, wherein the processing circuitry is further configured to re-select resources for the PSSCH reception based on the inter-UE coordination information.

3. The apparatus of claim 2, wherein the inter-UE coordination information includes reference signal received power (RSRP) thresholds for use in determining reserved resources of other UEs.

4. The apparatus of claim 3, wherein to exclude resources with potential conflicts, the processing circuitry is configured to:

apply a first of the RSRP thresholds to the PSSCH reception received from the peer UE; and apply a second of the RSRP thresholds to transmissions received from a third UE.

5. The apparatus of claim 4, wherein the inter-UE coordination information further includes priority information for each of the RSRP thresholds, and wherein the processing circuitry is configured determine which of the RSRP thresholds to apply based on a priority indicated in the SCI.

6. The apparatus of claim 4, wherein the UE is further configured to exclude single-slot resources belonging to slots where the UE does not expect to perform sidelink reception of a transport block due to half-duplex operation.

7. The apparatus of claim 4, wherein for the sidelink inter-UE coordination, the UE is configured in Mode 2 in which sidelink transmission resources are determined by the UE rather than the network.

8. The apparatus of claim 4, wherein when the RSRP thresholds include:

a first RSRP threshold for use in determining reserved resources of other UEs; and a second RSRP threshold for use in determining priorities for resource conflicts.

9. The apparatus of claim 4, wherein the processing circuitry is to configure the UE to perform sensing to determine RSRP levels for comparison to the RSRP thresholds.

10. A non-transitory computer-readable storage medium that stores instructions for execution by processing circuitry of a user equipment (UE) configured for sidelink inter-UE coordination in a fifth-generation new radio (5G NR) network, the processing circuitry configured to:

decode a physical sidelink feedback channel (PSFCH) received from a peer UE, the PSFCH comprising inter-UE coordination information;

decode a sidelink control information (SCI) scheduling a physical sidelink shared channel (PSSCH) reception from the peer UE;

select, based on the inter-UE coordination information, resources for transmitting Hybrid Automatic Repeat request (HARQ-ACK) feedback in response to the PSSCH reception; and encode a PSFCH to include the HARQ-ACK feedback for transmission on the resources selected for transmitting the HARQ-ACK feedback, wherein to select the resources for transmitting the HARQ-ACK feedback, the processing circuitry is configured to exclude resources with potential conflicts from a resource set indicated by the inter-UE coordination information, wherein the processing circuitry is further configured to:

determine, based on the SCI, a set of resources that are reserved for the PSSCH reception;

determine conflict information for the set of resources that are reserved for the PSSCH reception; and encode a PSFCH for transmission to the peer UE, the PSFCH encoded to provide the conflict information to the peer UE.

11. The non-transitory computer-readable storage medium of claim 10, wherein the processing circuitry is further configured to re-select resources for the PSSCH reception based on the inter-UE coordination information.

12. The non-transitory computer-readable storage medium of claim 11, wherein the inter-UE coordination information includes reference signal received power (RSRP) thresholds for use in determining reserved resources of other UEs.

13. The non-transitory computer-readable storage medium of claim 12, wherein to exclude resources with potential conflicts, the processing circuitry is configured to:

apply a first of the RSRP thresholds to the PSSCH reception received from the peer UE; and apply a second of the RSRP thresholds to transmissions received from a third UE.

14. The non-transitory computer-readable storage medium of claim 13, wherein the inter-UE coordination information further includes priority information for each of the RSRP thresholds, and wherein the processing circuitry is configured determine which of the RSRP thresholds to apply based on a priority indicated in the SCI.

15. The non-transitory computer-readable storage medium of claim 13, wherein the UE is further configured to exclude single-slot resources belonging to slots where the UE does not expect to perform sidelink reception of a transport block due to half-duplex operation.

16. An apparatus for user equipment (UE) configured for sidelink inter-UE coordination in a fifth-generation new radio (5G NR) network, the apparatus comprising: processing circuitry and memory, the processing circuitry configured to:

encode a physical sidelink feedback channel (PSFCH) for transmission to a peer UE, the PSFCH comprising inter-UE coordination information;

encode a sidelink control information (SCI) scheduling a physical sidelink shared channel (PSSCH) transmission to the peer UE;

decode a PSFCH received from the peer UE, the PSFCH received on resources selected by the peer UE for transmitting Hybrid Automatic Repeat request (HARQ-ACK) feedback in response to the PSSCH transmission, wherein resources with potential conflicts are excluded by the peer UE from a resource set indicated by the inter-UE coordination information, wherein the processing circuitry is further configured to decode a PSFCH received from the peer UE, the PSFCH indicating conflict information for the set of resources that are reserved for the PSSCH.

17. The apparatus of claim 16, wherein the inter-UE coordination information includes reference signal received power (RSRP) thresholds for use in determining, by the peer UE, reserved resources of other UEs.

* * * * *